United States Patent [19]
Blackburn et al.

[11] Patent Number: 5,202,831
[45] Date of Patent: Apr. 13, 1993

[54] METHOD AND APPARATUS FOR CONTROLLING AN OCCUPANT RESTRAINT SYSTEM USING REAL TIME VECTOR ANALYSIS

[75] Inventors: Brian K. Blackburn, Rochester; Joseph F. Mazur, Washington; Scott B. Gentry, Shelby Township, Macomb County, all of Mich.

[73] Assignee: TRW Vehicle Safety Systems Inc., Lyndhurst, Ohio

[21] Appl. No.: 727,610

[22] Filed: Jul. 9, 1991

[51] Int. Cl.$^5$ ............................................. B60R 21/32
[52] U.S. Cl. .................... 364/424.05; 180/282; 280/735; 340/436; 307/10.1
[58] Field of Search ................ 364/424.05; 340/436, 340/438; 307/9.1, 10.1; 180/232, 271, 282; 280/728, 734, 735

[56] References Cited

U.S. PATENT DOCUMENTS

| | | | |
|---|---|---|---|
| 3,172,684 | 3/1965 | Isaac | 340/730 |
| 3,874,695 | 4/1975 | Abe et al. | 280/735 |
| 4,117,450 | 9/1978 | Lavalley et al. | 340/436 |
| 4,836,024 | 6/1989 | Woehrl et al. | 280/735 |
| 4,980,573 | 12/1990 | White et al. | 180/282 |
| 4,984,651 | 1/1991 | Grösch et al. | 180/282 |
| 4,987,316 | 1/1991 | White et al. | 340/436 |
| 5,058,920 | 10/1991 | Burger et al. | 280/735 |
| 5,068,640 | 11/1991 | Burger et al. | 307/10.1 |

Primary Examiner—Gary Chin
Attorney, Agent, or Firm—Tarolli, Sundheim & Covell

[57] ABSTRACT

An apparatus for restraining a vehicle occupant during a crash of the vehicle comprises a first crash sensor securable to the vehicle and having a sensitivity axis parallel with a front-to-rear axis of the vehicle. The first sensor provides a signal having a value functionally related to crash energy directed parallel to the front-to-rear axis of the vehicle and impervious to crash energy directed parallel to a side-to-side axis of the vehicle. A second crash sensor is also securable to the vehicle and has a sensitivity axis parallel with a side-to-side axis of the vehicle. The second crash sensor provides a signal having a value functionally related to crash energy directed parallel to the side-to-side axis of the vehicle and impervious to crash energy directed parallel to the front-to-rear axis of the vehicle. The first and second crash sensors have their sensitivity axes oriented along mutually orthogonal axes. The apparatus further comprises a controller connected to the first and second crash sensors for determining a crash vector of a crash condition in response to the signals from the first and second crash sensors. Each of a plurality of actuatable occupant restraint devices is connected to the controller. The controller controls which of the plurality of actuatable occupant restraint systems is or are actuated in response to the determined crash vector.

23 Claims, 3 Drawing Sheets

METHOD AND APPARATUS FOR CONTROLLING AN OCCUPANT RESTRAINT SYSTEM USING REAL TIME VECTOR ANALYSIS

TECHNICAL FIELD

The present invention is directed to a vehicle occupant restraint system and is particularly directed to a method and apparatus for determining the magnitude and direction of a vehicle crash and controlling an occupant restraint system in response to such determinations.

BACKGROUND OF THE INVENTION

Actuatable occupant restraint systems are well known in the art. Such systems include a crash sensor and an actuatable restraining device. When a crash condition is sensed by the crash sensor, the restraining device is actuated. One known type of crash sensor used in occupant restraint systems is an inertia sensor.

An inertia sensor typically includes a weight movably mounted in a housing so that the weight moves relative to the housing in response to the sensor being subjected to a change in force. When a vehicle is in a crash condition, the weight of an attached sensor moves relative to the sensor housing since the crash effectuates force changes. The sensor includes or is connected to an electric circuit which is arranged so that movement of the weight relative to the housing for a predetermined distance closes the electric circuit. Such movable weight inertia sensors are typically mounted to a vehicle so that the direction of relative movement between the weight and the sensor housing is parallel to the front-to-rear axis of the vehicle. In other words, the sensor's axis of sensitivity is parallel with the front-to-rear axis of the vehicle.

A vehicle crash into a barrier oriented 90° relative to the front-to-rear axis of a vehicle is referred to in the art as a frontal crash. All other crashes are referred to as non-frontal crashes. A movable weight inertia sensor mounted parallel to the front-to-rear axis of a vehicle provides a "measurement" of the inertia of a frontal crash. If the vehicle is subjected to a non-frontal crash, the inertia sensor provides a "measurement" of a component of the inertia having a value functionally related to the sine of the angle between the direction of travel of the vehicle and a line normal to the object hit.

Other types of vehicle crash sensors measure "crash energy." Actuation of the occupant restraint system is controlled in response to the measured crash energy. Such energy type crash sensors are typically mounted to the vehicle so as to measure the energy of a frontal crash, i.e., the axis of sensitivity of the sensor is parallel with the front-to-rear axis of the vehicle. Similarly, if the crash is a non-frontal crash, the sensor provides an indication of a component of the crash energy along the sensitivity axis of the sensor.

Occupant restraint systems may include a plurality of restraining devices such as a plurality of airbags surrounding the occupant. Occupant restraint systems may also include a combination of different types of restraining devices such as a plurality of airbags and a plurality of seat belts having actuatable locking devices In such occupant restraint systems having a plurality of restraining devices, it is desirable to be able to determine the direction of the crash and actuate those devices which are located to best protect the occupant during the crash. It is further desirable to determine the magnitude of the crash so as to control timing of the actuation of the restraining device.

SUMMARY OF THE PRESENT INVENTION

The present invention provides a new method and apparatus for restraining a vehicle occupant during a vehicle crash and is particularly directed to a method and apparatus for determining the direction and magnitude of a vehicle crash and controlling actuation of at least one of a plurality of restraint devices in response to the determined direction and magnitude of the crash.

In accordance with present invention, an apparatus is provided for restraining a vehicle occupant during a crash of the vehicle. The apparatus comprises first crash sensor means securable to the vehicle and having a sensitivity axis parallel with a front-to-rear axis of the vehicle. The first crash sensor means provides a signal having a value functionally related to crash energy directed parallel to the front-to-rear axis of the vehicle and substantially impervious to crash energy directed parallel to the side-to-side axis of the vehicle. The apparatus further comprises second crash sensor means securable to the vehicle and having a sensitivity axis parallel with a side-to-side axis of the vehicle. The second crash sensor means provides a signal having a value functionally related to crash energy directed parallel to the side-to-side axis of the vehicle and substantially impervious to crash energy directed parallel to the front-to-rear axis of the vehicle. The first crash sensor means and the second crash sensor means have their sensitivity axes oriented along mutually orthogonal axes. Control means is connected to the first crash sensor means and to the second crash sensor means for determining a crash vector of a crash condition in response to the signals from the first crash sensor means and the second crash sensor means. A plurality of actuatable occupant restraint devices are connected to the control means. The control means controls which of the plurality of actuatable occupant restraint devices are actuated in response to the determined crash vector Also in accordance with the present invention, a method is provided for restraining a vehicle occupant during a crash of the vehicle. The method comprises the step of mounting a first crash sensor to the vehicle with the sensitivity axis of the first crash sensor being parallel with a front-to-rear axis of the vehicle. The first crash sensor provides a signal having a value functionally related to crash energy directed parallel to the front-to-rear axis of the vehicle and substantially impervious to crash energy directed parallel to the side-to-side axis of the vehicle. The method also comprises the step of mounting a second crash sensor to the vehicle with the sensitivity axis of the second crash sensor parallel with a side-to-side axis of the vehicle. The second crash sensor provides a signal having a value functional related to crash energy directed parallel to the side-to-side axis of the vehicle and substantially impervious to crash energy directed parallel to the front-to-rear axis of the vehicle. The sensitivity axis of the first crash sensor and the sensitivity axis of the second crash sensor are oriented along mutually orthogonal axes. The method further includes the step of mounting a plurality of actuatable occupant restraint devices in the vehicle. Still further, the method comprises the steps of determining a crash vector of a crash condition in response to the signals from the first crash sensor and the second crash sensor, and controlling which of the plurality of actuatable occupant restraint devices are actuated in response to the determined crash vector.

DESCRIPTION OF THE DRAWINGS

Further features of the present invention will become apparent to those skilled in the art to which the present invention relates from reading the following specification with reference to the accompanying drawings, in which.

DETAILED DESCRIPTION

Figure 1:
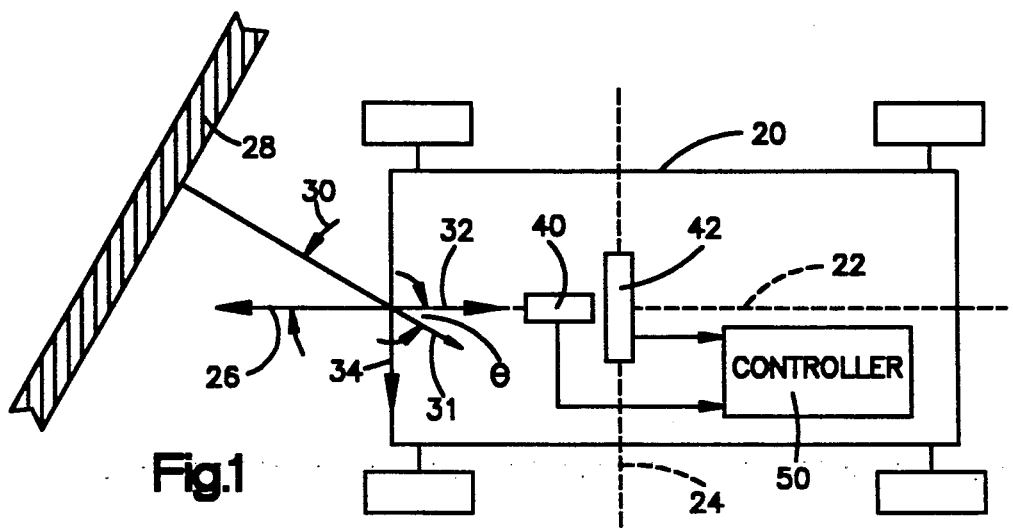
FIG. 1 is a schematic illustration of a vehicle having orthogonally arranged sensors in accordance with the present invention.

Referring to FIG. 1, a vehicle 20 has a front-to-rear axis 22 and a side-to-side axis 24. The vehicle 20 is moving in a direction indicated by arrow 26 toward a barrier 28. The vehicle 20 is approaching (and eventually crashes into) the barrier 28 at an angle 30 relative to the front-to-rear axis 22 of the vehicle. The angle 30 is the angle between the direction of travel of the vehicle 20 and the normal to the barrier 28. If the angle 30 were equal to zero, the crash between the vehicle 20 and the barrier would be a straight ahead collision. For the purpose of discussion, it is assumed that the angle 30 is greater than 0° and less than 90°. The crash, as "seen" by the vehicle, is a vector 31 which has both magnitude and direction. The crash vector 31 has an x-component, indicated with arrow 32, parallel with the front-to-rear axis 22 and has a y-component, indicated with arrow 34, parallel with the side-to-side axis 24. The crash vector 31 has an angle Θ. It should be appreciated that the angle 30 is equal to the crash vector angle.

A first crash sensor 40 is mounted so as to have its sensitivity axis parallel with the front-to-rear axis 22. The crash sensor 40 is substantially impervious to crash energy directed parallel to the side-to-side axis 24 of the vehicle. A second crash sensor 42 is mounted so as to have its sensitivity axis parallel with the side-to-side axis 24. The crash sensor 42 is substantially impervious to crash energy directed parallel to the front-to-rear axis 22 of the vehicle. Each of the sensors 40, 42 is electrically connected to an electronic controller 50 which is carried by the vehicle 20. The controller 50 monitors the output signals from the sensors 40, 42 and determines the magnitude and direction of the crash vector 31 in response to these output signals.

The sensors 40, 42 can be any of several known sensors that provide a signal having a value indicative of the crash energy directed in a direction relative to the sensor which is referred to and previously described as the axis of sensitivity of the sensor. One type of a sensor that can be used is an accelerometer having a defined axis of sensitivity. One such accelerometer is manufactured by IC Sensors, 1701 McCarthy Blvd., Milpitas, Calif. 95035, under Patent No. 3026-100-R. A maximum signal is output from such a crash sensor when the direction of the crash is parallel with the sensitivity axis. The magnitude of the crash signal follows a sine function relative to the sensitivity axis. A crash occurring at an angle of 90° relative to the sensor's sensitivity axis is not "seen" by the sensor.

The sensors 40, 42 may include a vibrating mass which is permitted to vibrate only in a direction parallel with the direction of the sensor's sensitivity axis. The vibrating mass is connected to a housing through a cantilever member. A resistive strain gauge is operatively connected on the cantilever member. As the mass vibrates, the resistance of the strain gauge varies. The resistive strain gauge is one component in a resistor dividing network. The output of the resistor dividing network is connected to a monitoring circuit, such as an integrator. The output voltage of the integrator is indicative of the magnitude of the crash component in the direction parallel with the sensitivity axis of the sensor. Although a specific arrangement of a sensor has been described, it should be understood that any sensor that provides a signal having a value indicative of the magnitude of the crash component in the direction parallel with the sensitivity axis of the sensor can be used.

Figure 2:
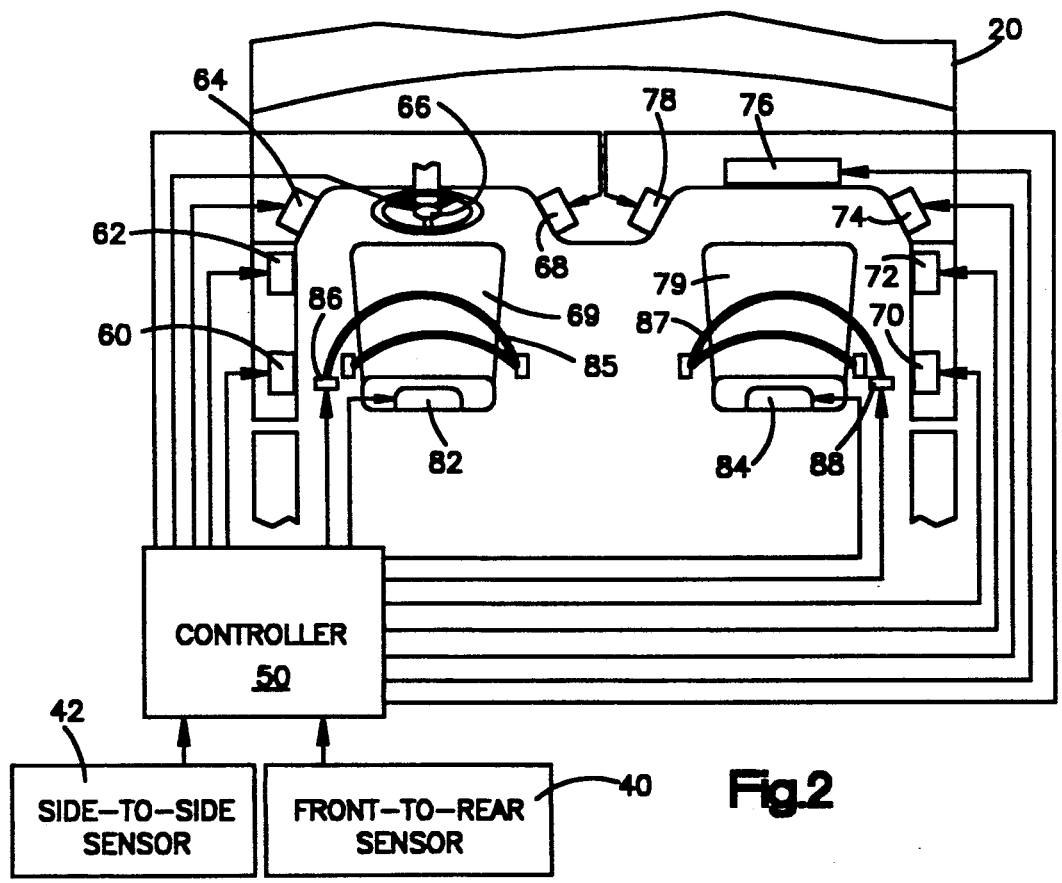
FIG. 2 is a schematic illustration of a vehicle equipped with a plurality of restraint devices in accordance with the present invention.

Referring to FIG. 2, a plurality of driver side airbags 60, 62, 64, 66, 68 are mounted about the driver's seat 69. Airbags 60, 62 are located in the driver's door. Airbag 66 is located in the steering wheel. Airbags 64, 68 are mounted in the dash board leftward and rightward, respectively, of the steering wheel. A plurality of passenger side airbags 70, 72, 74, 76, 78 are mounted about the passenger's seat 79. Airbags 70, 72 are located in the passenger's door Airbags 74-78 are located in the dash board. Each of the airbags 60-68 and 70-78 is electrically connected to the controller 50. The controller 50 controls the actuation of any one or more of the airbags in response to the determined angle and magnitude of the crash vector 31. As is well known in the art, inflation of an airbag restraint system cushions the occupant from the effect of a collision.

The invention also contemplates use of other actuatable restraint devices such as inflatable lumbar supports 82, 84 located in the back portion of the driver's seat 69 and the passenger's seat 79, respectively. The inflatable lumbar supports 82, 84 are also connected to the controller 50. Once inflated by the controller, each lumbar support provides support for the back of an occupant of the associated seat.

The driver's seat is also equipped with a shoulder/lap belt 85 having an actuatable locking retractor 86. Similarly, the passenger's seat is equipped with a shoulder/lap belt 87 having an actuatable locking retractor 88. Although the locking retractors 86, 88 are shown in FIG. 2 as being mounted adjacent the occupant's shoulder, it will be appreciated that the retractors may be secured to the vehicle floor or the seats 69, 79. The actuatable locking retractors 86, 88 function to store the belt webbing under a spring tension force. The retractors are connected to the controller 50. Once actuated electrically by the controller 50, the retractors 86, 88 for the shoulder/lap belts 85, 87 are locked so that no more webbing can unwind from the retractor. The locked belts tend to restrain the occupants in their seats.

Figure 3:
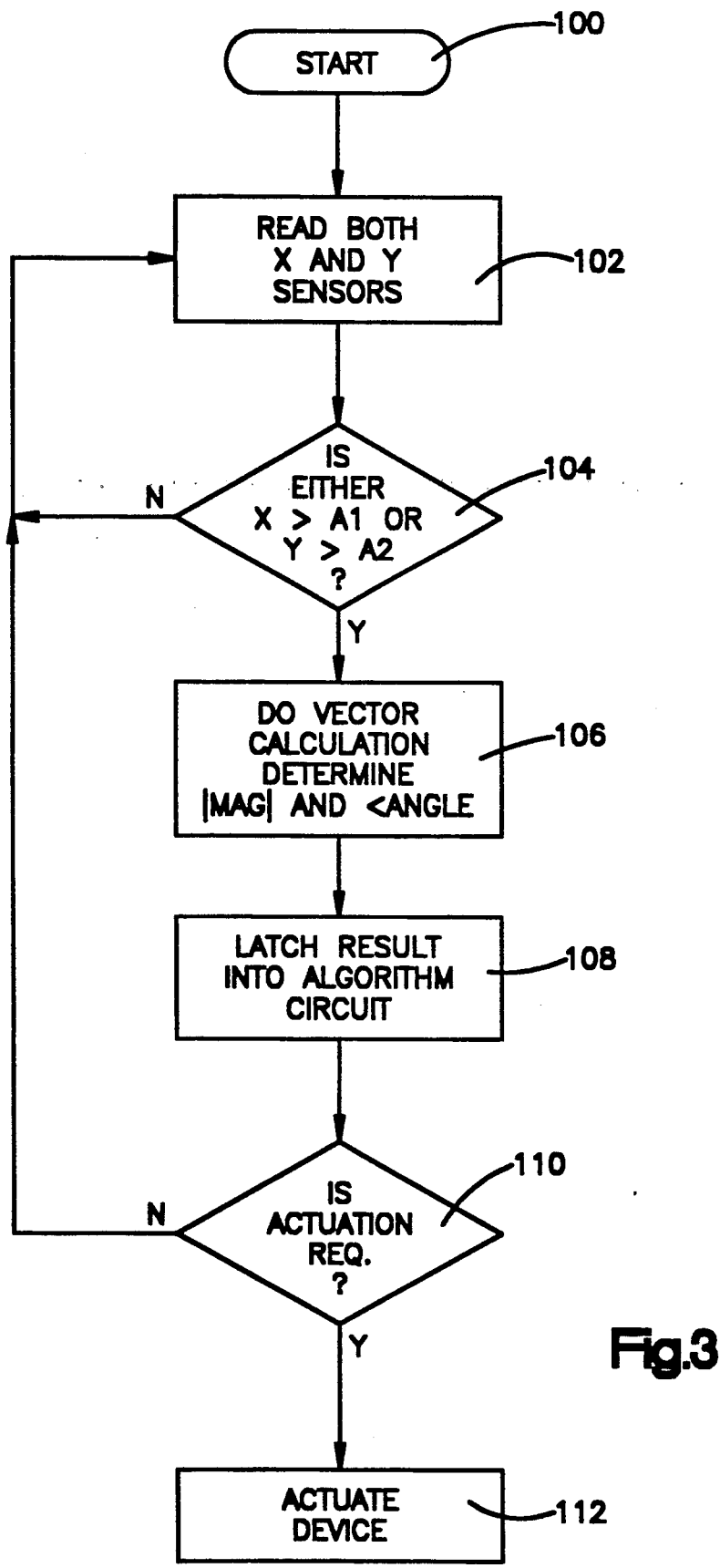
FIG. 3 is a flow chart depicting a control process in accordance with the present invention.

In FIG. 3, a flow chart depicts the control process followed by controller 50 in accordance with the present invention. The process starts in step 100 where the controller initializes itself, e.g., sets internal flags, clears internal memory, etc., as is well known in the art. The controller 50 is preferably a microcontroller of the type having internal processing and storage capabilities. The process proceeds to step 102 where both the front-torear ("X") sensor 40 and the side-to-side ("Y") sensor 42 are monitored by the controller 50.

The process, in step 104, includes a determination as to whether the signal from the X sensor 40 is greater in magnitude than a predetermined limit value A1 and whether the signal from the Y sensor 42 is greater in magnitude than a predetermined limit value A2. If neither of the signals from the X and Y sensors is greater in magnitude than its associated limit value, the process returns to step 102. If the determination in step 104 is affirmative for either signal, this indicates that a vehicle crash is occurring. From an affirmative determination in step 104, the process proceeds to step 106 where the magnitude and angle Θ of the crash vector 31 are determined.

The signals from the X and Y sensors are indicative of the magnitude of the deceleration of the vehicle in the X (front-to-rear) and Y (side-to-side) directions. Although the deceleration signals can be processed directly for a determination of the magnitude and direction of a crash deceleration vector, it has been discovered that determination of the magnitude and direction of a crash velocity vector provides a smoother curve of the result over time. To determine the direction and magnitude of the crash velocity vector, the deceleration signals are integrated over time. The magnitude of the crash velocity vector is determined in accordance with the following equation:

$$|MAG| = \sqrt{\left(\int_{t_0}^{t_1} X\,dt\right)^2 + \left(\int_{t_0}^{t_1} Y\,dt\right)^2}$$

The angle Θ of the crash velocity vector is determined in accordance with the following equation:

$$\theta = \arctan\left(\frac{\left(\int_{t_0}^{t_1} Y\,dt\right)}{\left(\int_{t_0}^{t_1} X\,dt\right)}\right)$$

Figure 4:
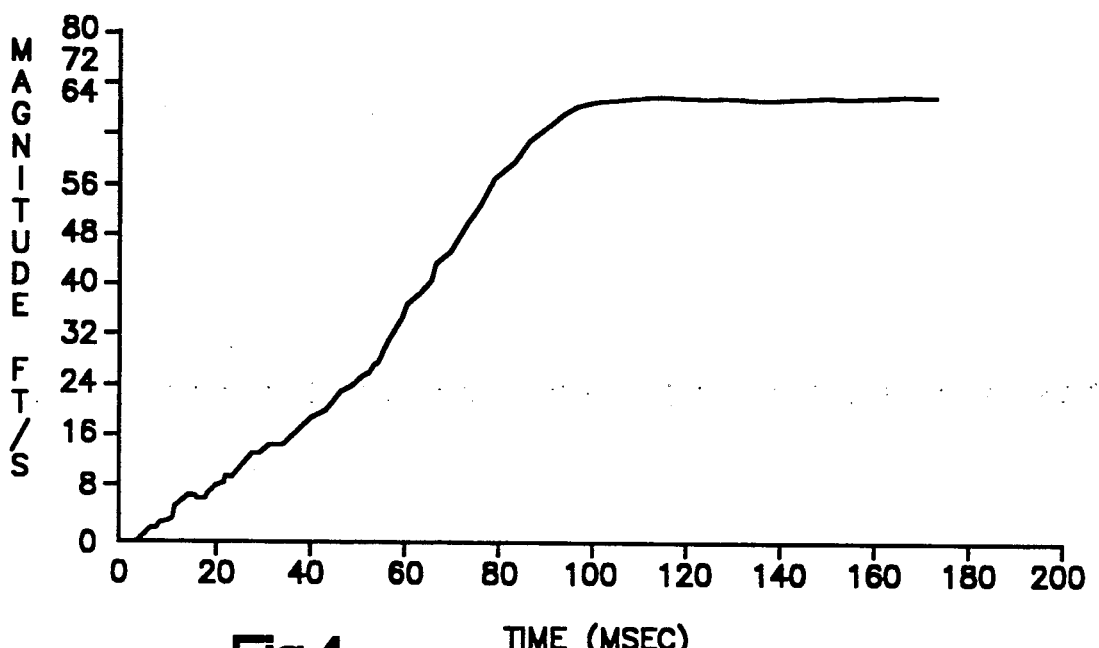
FIG. 4 is a graph depicting crash magnitude as a function of time.
Figure 5:
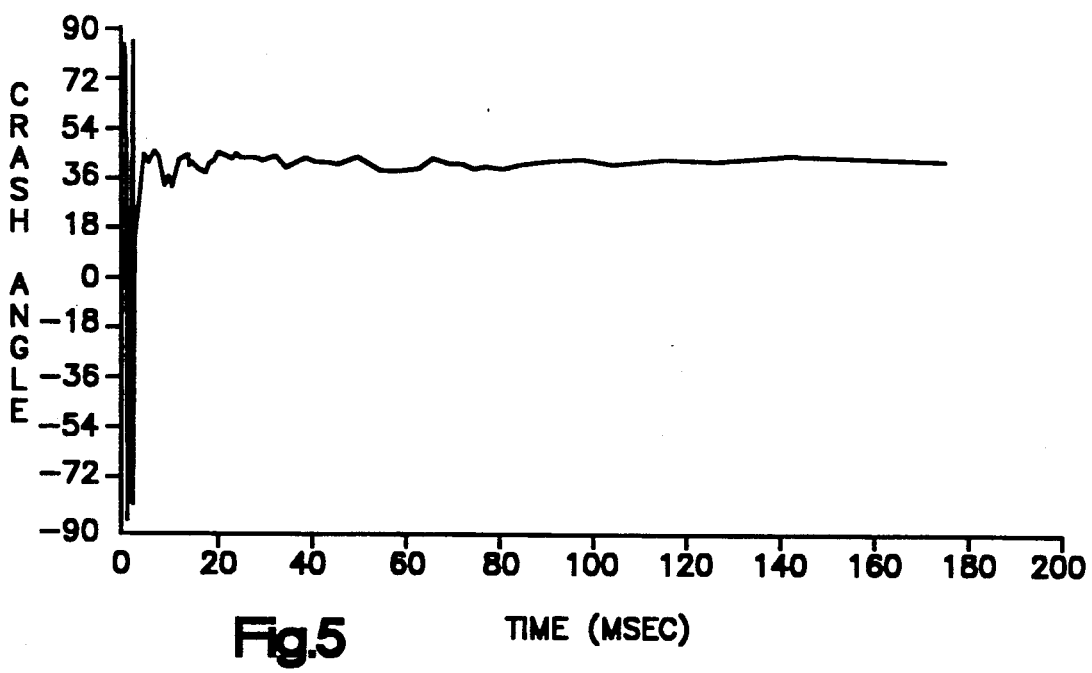
FIG. 5 is a graph depicting determined crash angle as a function of time.

FIG. 4 is a graph showing the magnitude of the crash velocity vector as a function of time for a simulated vehicle crash at 30 MPH into a barrier at a 45° angle. The magnitude of the crash velocity crash vector shown in FIG. 4 was calculated in accordance with the above equation. FIG. 5 is a graph showing the direction of the crash velocity vector for the same crash used to derive FIG. 4. Note that during the first few milliseconds of the crash, the result of the direction calculation oscillates. Within 5 milliseconds, the resultant direction calculation settles out so as to provide a good indication of the direction of the crash velocity vector. It should be appreciated that the direction of the crash velocity vector is equal to the direction of the crash acceleration vector which is equal to the direction of the crash. When the angle of the crash vector is 0°, such implies that the crash is a straight-ahead collision. When the angle Θ is between 0° and plus 90°, the crash is from the front right of the vehicle. When the angle Θ is between 0 and negative 90°, the crash is from the front left of the vehicle.

The determined magnitude and direction of the crash velocity vector 31 are stored or latched in an internal memory of the controller 50 in step 108 of FIG. 3. By repeatedly determining the direction and magnitude of the crash and storing the results, each curve of the calculation result over time is relatively smooth. The controller determines in step 110 as to whether actuation of an occupant restraint system is required for protection of the vehicle occupants.

The controller 50 uses the determination of the magnitude of the crash velocity vector to resolve the determination of step 110. The determined magnitude is compared against a predetermined limit in step 110. If the determined magnitude is greater than a predetermined value, actuation is required. If the magnitude is not greater than the predetermined value, actuation is not required. If the determination in step 110 is negative, the process returns to step 102. If the controller determines that the magnitude of the velocity vector is greater than a predetermined value, an appropriate restraint device is actuated by the controller 50.

The controller 50 also uses the determination of the magnitude of the crash velocity vector to control the timing of the actuation of the occupant restraint device(s). Each of the occupant restraint devices can have its own optimum actuation time based upon the determined velocity vector magnitude. For example, the airbags may be deployed when the magnitude of the velocity vector exceeds an associated predetermined limit value. The actuatable seat belt locking devices may be actuated when the magnitude of the velocity vector exceeds its associated limit value.

Once the controller 50 determines in step 110 that actuation of an occupant restraint system is required in step 110, the process proceeds to step 112 where one or more of the restraint devices is actuated. The determination of which device to actuate in step 112 depends upon the determined direction or angle of the vehicle crash. For example, if the crash vector direction indicates that the crash is from the right front of the vehicle, as viewed by the driver, at a 45° angle relative to the front-to-rear axis of the vehicle, the retractor 86 would be locked and the airbags 66, 68 deployed for the driver. Also, the retractor 88 and the airbags 70, 72, 74 would be deployed for the occupant. On the other hand, if the crash is determined to be a rear end crash parallel with the front-to-rear axis for the vehicle, i.e., the angle is greater than plus 90° or less than minus 90°, the lumbar supports 82, 84 would be actuated.

From the above description of a preferred embodiment of the invention, those skilled in the art will perceive improvements, changes and modifications. For example, specific occupant restraint devices were discussed. It is contemplated that other restraint devices can be used. For example, one can use a rolling seat arrangement which rolls or tilts the occupant seat backwards upon a detected frontal crash. Such improvements, changes, and modifications within the skill of the art are intended to be covered by the appended claims.

Having fully described the invention, the following is claimed.

1. An apparatus for restraining a vehicle occupant during a crash of the vehicle comprising:
   first crash sensor means securable to the vehicle and having a sensitivity axis parallel with a front-to-rear axis of the vehicle for providing a signal having a value functionally related to crash energy directed parallel to the front-to-rear axis of the vehicle and substantially impervious to crash energy directed parallel to a side-to-side axis of the vehicle;

second crash sensor means securable to the vehicle and having a sensitivity axis parallel with the side-to-side axis of the vehicle for providing a signal having a value functionally related to crash energy directed parallel to the side-to-side axis of the vehicle and substantially impervious to crash energy directed parallel to the front-to-rear axis of the vehicle, said first crash sensor means and said second crash sensor means having their sensitivity axes oriented along mutually orthogonal axes;

control means electrically connected to said first crash sensor means and to said second crash sensor means for determining a crash vector of a crash condition in response to the signals from said first crash sensor means and said second crash sensor means; and a plurality of actuatable occupant restraint devices, each electrically connected to said control means, said control means controlling which of said plurality of actuatable occupant restraint devices is or are actuated in response to the determined crash vector.

2. The apparatus of claim 1 wherein each of said first crash sensor means and said second crash sensor means provides a signal indicative of deceleration of the vehicle in a direction parallel with the sensitivity of axis of the corresponding crash sensor, and wherein said crash vector is a deceleration crash vector.

3. The apparatus of claim 2 wherein said control means determines both magnitude and direction of said determined deceleration crash vector, and wherein said control means includes means for controlling the timing of said actuation of said plurality of restraint devices in response to the determined magnitude of said deceleration vector and means for controlling which of said plurality of restraint devices is or are actuated in response to the determined direction of said deceleration crash vector.

4. The apparatus of claim 1 wherein each of said first crash sensor means and said second crash sensor means provides a signal indicative of deceleration of the vehicle in a direction parallel with its associated sensitivity axis, and wherein said control means includes means for determining a crash velocity vector from said deceleration signals from said first crash sensor means and from said second crash sensor means.

5. The apparatus of claim 4 wherein said control means includes means for determining both magnitude and direction of said determined crash velocity vector, and wherein said control means includes means for controlling the timing of said actuation of said plurality of restraint devices in response to the determined magnitude of said crash velocity vector and means for controlling which of said plurality of restraint devices is or are actuated in response to the determined direction of said crash velocity vector.

6. The apparatus of claim 5 wherein said control means determines the magnitude of the velocity vector in accordance with the following equation:

$$|MAG| = \sqrt{\left(\int_{t_0}^{t_1} X\, dt\right)^2 + \left(\int_{t_0}^{t_1} Y\, dt\right)^2}$$

where X is the value of the deceleration signal from the first crash sensor means and Y is the value of the deceleration signal from the second crash sensor means.

7. The apparatus of claim 5 wherein said control means determines the direction of the velocity vector in accordance with the following equation $$\theta = \arctan\left(\frac{\left(\int_{t_0}^{t_1} Y\, dt\right)}{\left(\int_{t_0}^{t_1} X\, dt\right)}\right)$$

where X is the value of the deceleration signal from the first crash sensor means and Y is the value of the deceleration signal from the second crash sensor means.

8. The apparatus of claim 1 wherein said plurality of actuatable occupant restraint devices includes a plurality of airbags surrounding the occupant, said control means controlling actuation of said airbags in response to the determined crash vector.

9. The apparatus of claim 1 wherein said plurality of actuatable occupant restraint devices includes an airbag, a lockable seat belt, and an inflatable lumbar support, said control means controlling deployment of said airbag, locking of said lockable seat belt, and inflating of said lumbar support in response to the determined crash vector.

10. An apparatus for restraining a vehicle occupant during a crash of the vehicle comprising:

first crash sensor means securable to the vehicle and having a sensitivity axis parallel with a front-to-rear axis of the vehicle for providing a signal having a value functionally related to crash energy directed parallel to the front-to-rear axis of the vehicle and substantially impervious to crash energy directed parallel to a side-to-side axis of the vehicle;

second crash sensor means securable to the vehicle and having a sensitivity axis parallel with the side-to-side axis of the vehicle for providing a signal having a value functionally related to crash energy directed parallel to the side-to-side axis of the vehicle and substantially impervious to crash energy directed parallel to the front-to-rear axis of the vehicle, said first crash sensor means and said second crash sensor means having their sensitivity axes oriented along mutually orthogonal axes;

control means electrically connected to said first crash sensor means and to said second crash sensor means for determining a direction of a crash condition in response to the signals from said first crash sensor means and said second crash sensor means; and a plurality of actuatable occupant restraint devices, each electrically connected to said control means, said control means controlling which of said plurality of actuatable occupant restraint systems is or are actuated in response to the determined crash direction.

11. The apparatus of claim 10 wherein each of said first crash sensor means and said second crash sensor means provide a signal indicative of deceleration of the vehicle in a direction parallel with the sensitivity axis of the corresponding crash sensor.

12. The apparatus of claim 11 wherein said control means determines both magnitude and direction of the deceleration of the vehicle and wherein said control means includes means for controlling the timing of said actuation of said plurality of restraint devices in response to the determined magnitude of the vehicle deceleration and means for controlling which of said plurality of restraint devices is or are actuated in response to the determined direction of the vehicle deceleration.

13. The apparatus of claim 10 wherein each of said first crash sensor means and said second crash sensor means provides a signal indicative of deceleration of the vehicle in a direction parallel with its associated sensitivity axis, and wherein said control means includes means for determining a crash velocity vector form said deceleration signals from said first crash sensor means and from said second crash sensor means.

14. The apparatus of claim 13 wherein said control means determines both magnitude and direction of said determined velocity crash vector, and wherein said control means includes means for controlling the timing of said actuation of said plurality of restraint devices in response to the determined magnitude of said velocity crash vector and means for controlling which of said plurality of restraint devices is or are actuated in response to the determined direction of said velocity crash vector.

15. The apparatus of claim 14 wherein said control means determines the magnitude of the velocity vector in accordance with the following equation:

$$|MAG| = \sqrt{\left(\int_{t_0}^{t_1} X\, dt\right)^2 + \left(\int_{t_0}^{t_1} Y\, dt\right)^2}$$

where X is the value of the deceleration signal from the first crash sensor means and Y is the value of the deceleration signal from the second crash sensor means.

16. The apparatus of claim 14 wherein said control means determines the direction of the velocity vector in accordance with the following equation:

$$\theta = \arctan\left(\frac{\left(\int_{t_0}^{t_1} Y\, dt\right)}{\left(\int_{t_0}^{t_1} X\, dt\right)}\right)$$

where X is the value of the deceleration signal from the first crash sensor means and Y is the value of the deceleration signal from the second crash sensor means.

17. The apparatus of claim 10 wherein said plurality of actuatable occupant restraint devices includes a plurality of airbags surrounding the occupant, said control means controlling actuation of said airbags in response to the determined crash direction 18. The apparatus of claim 10 wherein said plurality of actuatable occupant restraint devices includes an airbag, a lockable seat belt, and an inflatable lumbar support, said control means controlling deployment of said airbag, locking of said lockable seat belt, and inflating of said inflatable lumbar support in response to the determined crash direction 19. A method for restraining a vehicle occupant during a crash of the vehicle, said method comprising the steps of:

mounting a first crash sensor to the vehicle with a sensitivity axis of the first crash sensor being parallel with a front-to-rear axis of the vehicle, the first crash sensor providing a signal having a value functionally related to crash energy directed parallel to the front-to-rear axis of the vehicle and substantially impervious to crash energy directed parallel to a side-to-side axis of the vehicle;

mounting a second crash sensor to the vehicle with a sensitivity axis of the second crash sensor parallel with the side-to-side axis of the vehicle, the second crash sensor providing a signal having a value functionally related to crash energy directed parallel to the side-to-side axis of the vehicle and impervious to crash energy directed parallel to the front-to-rear axis of the vehicle, the sensitivity axis of the first crash sensor and the sensitivity axis of the second crash sensor being oriented along mutually orthogonal axes;

mounting a plurality of actuatable occupant restraint devices in the vehicle;

determining a crash vector of a crash condition in response to the signals form the first crash sensor and the second crash sensor; and controlling which of said plurality of actuatable occupant restraint devices is or are actuated in response to the determined crash vector.

20. The method of claim 19 wherein each of the first crash sensor and the second crash sensor provides a signal indicative of deceleration of the vehicle in a direction parallel with the sensitivity axis of the corresponding sensor, and wherein said step of determining a crash vector includes determining a velocity crash vector in response to the deceleration signals from the first and second crash sensors.

21. The method of claim 20 wherein said step of determining a crash vector includes determining both magnitude and direction of the velocity crash vector, and wherein said step of controlling includes the step of controlling the timing of actuation of the plurality of restraint devices in response to the determined magnitude of the velocity crash vector and controlling which of the plurality of restraint devices is or are actuated in response to the determined direction of the velocity vector.

22. The method of claim 21 wherein the magnitude of the velocity crash vector is determined in accordance with the following equation:

$$|MAG| = \sqrt{\left(\int_{t_0}^{t_1} X\, dt\right)^2 + \left(\int_{t_0}^{t_1} Y\, dt\right)^2}$$

where X is the value of the deceleration signal from the first crash sensor and Y is the value of the deceleration signal from the second crash-sensor.

23. The apparatus of claim 21 wherein the direction of the velocity crash vector is determined in accordance with the following equation:

$$\theta = \arctan\left(\frac{\left(\int_{t_0}^{t_1} Y\, dt\right)}{\left(\int_{t_0}^{t_1} X\, dt\right)}\right)$$

where X is the value of the deceleration signal from the first crash sensor and Y is the value of the deceleration signal from the second crash sensor.

* * * * *

$$\theta = \arctan\left(\frac{\left(\int_{t_0}^{t_1} Y\, dt\right)}{\left(\int_{t_0}^{t_1} X\, dt\right)}\right)$$

where X is the value of the deceleration signal from the first crash sensor and Y is the value of the deceleration signal from the second crash sensor.

* * * * *

UNITED STATES PATENT AND TRADEMARK OFFICE
CERTIFICATE OF CORRECTION

PATENT NO. : 5,202,831

DATED : April 13, 1993

INVENTOR(S) : Brian K. Blackburn, Joseph F. Mazur and Scott B. Gentry

It is certified that error appears in the above-identified patent and that said Letters Patent is hereby corrected as shown below:

Column 7, line 28, delete "of" (first occurrence).

Column 9, line 15, change "form" to -- from --.

Column 10, line 28, change "form" to -- from --.

Signed and Sealed this

Fourteenth Day of December, 1993

Attest:

BRUCE LEHMAN

*Attesting Officer*   *Commissioner of Patents and Trademarks*